Patented Oct. 9, 1951

2,570,499

UNITED STATES PATENT OFFICE 2,570,499

STARCH TITANIUM REACTION PRODUCT

Frank K. Signaigo, Kenmore, N. Y., assignor to E. I. du Pont de Nemours & Company, Wilmington, Del., a corporation of Delaware No Drawing. Application April 27, 1946, Serial No. 665,626

1 Claim. (Cl. 260—233.3)

This invention relates to new chemical products and processes for preparing the same, and more particularly to the manufacture and use of improved starches and starch adhesives.

Starches and starch derivatives are widely used as adhesives and impregnants for fibrous materials such as cellulosic products as exemplified by wood, paper, and fabrics. Starch is readily swelled by treatment with water and the resulting paste being made easily and of inexpensive material, finds many applications because of its adhesive properties. Starch may be modified by conversion to dextrin or by degradation through hydrolysis and the resulting products will show somewhat different properties. These starch products show a high sensitivity to water and the binding force is weakened when the bonded article becomes wet. Starch is hydrophilic and possesses substantial solubility or dispersability in water and this has made it unsuitable for many applications where contact with water may, accidentally or otherwise, take place. Accordingly, this invention has as an object, the means of increasing the usefulness of starch by modification of its properties with titanium compounds. Another object is to provide new and improved starch adhesives comprising titanated starch or starch titanate. A still further object is to provide new and useful derivatives of starch characterized by reduced solubility in water and articles of manufacture which are improved by said derivatives.

The above and other objects are accomplished by an operation, an essential step of which comprises bringing starch into contact with a reactive titanium compound. The latter may be a water soluble titanium compound such as titanium sulphate or titanium chloride, both of which are produced commercially or it may be hydrous titanium oxide such as results from the neutralization of a titanium compound with an agent capable of adjusting the pH of the titanium salt to substantially the neutral point, or pH 7. Such neutralizing agents may be an acid when a titanate salt is being treated or it may be an alkali when an acidic salt is being neutralized. The reactive compounds of titanium also include organic compounds of titanium such as titanium acetate, titanium glycollate, titanium tartrate, titanium lactate and glyceryl titanate. Other reactive titanium compounds may be mentioned but in all cases the titanium is capable of reacting with starch or a derivative of starch to form a titanated starch compound which I prefer to refer to as starch titanate.

A specific embodiment of my invention comprises the treatment of a starch paste with a titanium sulphate solution followed by adjustment of the pH to substantial neutrality. This treatment results in the formation of the starch titanate compound which has been referred to above and which product is considerably different from the original starch in its solubility in water and also in other properties. The reaction of course, may be carried out by treatment of starch films with titanium salt solutions and in other selected manners, provided intimate association of the starch and the titanium compound is had.

In the use of my invention in the adhesives field, one may readily prepare a paste of starch in the usual manner and add thereto hydrated precipitated titanium dioxide and the resulting suspension used as an adhesive. The bonded articles are produced in the usual way as with other adhesives such as glue, and reaction takes place between titanium hydrate and starch upon the application of heat and pressure. The resulting bonded article is held together by the titanium starch compound which is no longer sensitive to water, and a much more useful bonded joint has thus been produced, as compared with the use of starch paste in the absence of reactive titanium hydrate compound.

For a clearer understanding of the invention, the following specific examples are given, each being merely illustrative in character and not intended to limit the scope of the invention:

Example I

Ten parts of corn starch were placed in 90 parts of water and warmed at 70° C. to form a paste. A film of this material was prepared by flowing the paste on a glass plate and drying at 70° C. for 3 hours. The film was stripped from the plate and swollen in water at 30° C. for 3 hours. The water was removed and the film covered with a titanyl sulphate solution containing 10 parts of titanium dioxide in 100 parts of solution. The film was allowed to remain in contact with this solution for 16 hours at 35° C. The titanyl sulphate solution was removed from the film and the film was washed twice with cold water, then washed with 3% ammonium hydroxide solution. The film was then dried at 70° C. It proved insoluble in boiling water and contained 21.4% of titanium dioxide.

Example II

Hydrous titanium dioxide corresponding closely in composition to orthotitanic acid ($H_4TiO_4$) was prepared by neutralizing a cold solution of titanium tetrachloride with ammonium hydroxide and washing the precipitate free from chlorides. The precipitated titanium dioxide was washed with alcohol and ether to remove excess water and dried to a hydrous titanium dioxide product having by analysis 64% $TiO_2$. A starch paste was prepared by adding 8 parts of pearl starch to 92 parts of water and to this was added 10 parts of the hydrous titanium dioxide prepared as indicated above. This mixture was also washed with alcohol and ether to remove water. This paste was used as an adhesive in the preparation of corrugated box-board made of kraft paper. The bonds were heated for 1 minute at 10 lb./sq. in. pressure and 130–135° C. On immersion in water at room temperature a similarly prepared control containing no hydrous $TiO_2$ delaminated in about 5 hours while the titanated bonds softened but separated only with tearing of the paper.

The above examples illustrate certain aspects of this invention and demonstrate how one may produce films of starch titanate as well as bonded cellulosic structures. The invention is not limited to such applications, as the modified starch adhesive may be used in the impregnation or modification of fabrics, paper and the like as well as in the preparation of laminated articles. The composition comprising starch and a reactive titanium compound is water insensitive after interaction between the two ingredients. This property especially recommends titanated starch for use in production of sizes, paper coating applications, water-resistant films, as well as in the field of adhesives.

It is intended that all types of starch as for example, the root starches such as potato, cassava, sweet potato, and arrowroot starch as well as the cereal starches such as wheat, corn, and rice starch be included in the scope of this invention. It is also intended that modified starches such as the soluble starches and dextrins be included as useful equivalents. Although certain specific, active titanium compounds have been mentioned in the foregoing examples, it is possible to employ other hydrous or water-soluble titanium compounds. Such compounds would include among others, titanyl sulphate, titanium lactate, titanium hydroxyacetate, titanium tetrachloride solution, titanyl chloride, freshly precipitated titanium hydroxide, pertitanic acid, hydrous titanium dioxide, orthotitanic acid and metatitanic acid. The more useful titanium compounds contain the element in the tetravalent condition.

The optimum temperature for the curing and setting of the starch will depend somewhat on the activity of the titanium compound. For very active titanating agents such as titanyl sulphate standing at room temperature for several hours will suffice, while for hydrous titanium dioxide and organic derivatives of titanium such as titanium hydroxyacetate a heat treatment may be used to give optimum results. In general, temperatures from room temperature to 175° C. and a time period up to 10 hours have been found to give optimum results.

The use of titanium salts such as titanyl sulphate and titanium chloride have a substantial effect on the acidity of the starch composition and very high acidities are to be avoided, especially when the starch is to be modified by a relatively large amount of titanium. Accordingly, it is best to avoid acid concentrations greater than that represented by the pH value of 2. As to pressure treatments in the formation of bonded articles and laminated products, it is usually best to apply heat at the same time. The adhesive in this case, may be conveniently made of hydrous titanium dioxide and a starch paste, the latter being the major ingredient, as shown in Example II. The reaction is facilitated by the heat and pressure treatment and a water-resistant bond is thus produced.

The amount of the reactive titanium compound to be used in conjunction with starch, may be varied within wide limits and the optimum amount will be determined by the nature of the starch and the use for which it is intended. Starches from various sources do not respond in exactly the same manner and the same is true of modified starches or degraded starches including dextrin which are regarded as equivalents in this invention. Good results are obtained by choosing conditions and quantities such that the concentration of titanium in the final product is within the limits of 1 to 25 parts by weight (figured as $TiO_2$) per 100 parts by weight of starch. The best water insensitive films will contain an amount of titanium oxide in the upper part of this range, while starch adhesives will give excellent results when containing from 5 to 15% titanium oxide when employing the less expensive commercial starches.

My novel starch adhesives are particularly useful in the preparation of bonded cellulosic articles such as wood furniture, plywood as well as other laminated cellulosic products. The members which are combined to give these bonded articles, may be coated with the adhesive comprising the reactive titanium compound and the starch product, although it is considered within scope of this invention to effect bonding by coating one member with a starch paste and the other with the reactive titanium compound after which contact of the two members is effected.

I claim as my invention:

A method of preparing a water-insensitive titanated starch product which consists in directly reacting starch with an aqueous solution of a reactive compound of titanium selected from the group consisting of a water-soluble sulfate and hydrous titanium oxide, effecting said reaction at from room to 175° C. temperature, and employing the reactants in such concentration that the resulting product contains from 1–25 parts by weight of titanium, calculated as $TiO_2$, per 100 parts by weight of starch.

FRANK K. SIGNAIGO.

REFERENCES CITED

The following references are of record in the file of this patent:

UNITED STATES PATENTS

| Number | Name | Date |
|---|---|---|
| 2,000,031 | Larson | May 7, 1935 |
| 2,287,161 | Ball | June 23, 1942 |
| 2,302,309 | Glarum et al. | Nov. 17, 1942 |
| 2,350,653 | Walsh et al. | June 6, 1944 |
| 2,397,732 | Gaver | Apr. 2, 1946 |
| 2,425,058 | Craig | Aug. 5, 1947 |